United States Patent
Barton et al.

(10) Patent No.: US 11,502,968 B1
(45) Date of Patent: Nov. 15, 2022

(54) AUTOMATICALLY ENSURING SYMMETRICAL LATENCY IN TELEPROTECTION SYSTEMS

(71) Applicant: Cisco Technology, Inc., San Jose, CA (US)

(72) Inventors: Robert E. Barton, Richmond (CA); Jerome Henry, Pittsboro, NC (US); Maik Guenter Seewald, Nuremberg (DE); Tony Clifford Allen, Burlington (CA)

(73) Assignee: Cisco Technology, Inc., San Jose, CA (US)

( * ) Notice: Subject to any disclaimer, the term of this patent is extended or adjusted under 35 U.S.C. 154(b) by 14 days.

(21) Appl. No.: 17/244,342

(22) Filed: Apr. 29, 2021

(51) Int. Cl.
  *H04L 45/74* (2022.01)
  *H04L 49/90* (2022.01)
  *H04L 47/56* (2022.01)

(52) U.S. Cl.
  CPC .............. *H04L 47/56* (2013.01); *H04L 45/74* (2013.01); *H04L 49/90* (2013.01)

(58) Field of Classification Search
  CPC ......... H04L 47/56; H04L 45/74; H04L 49/90; H04L 43/0852; H04L 43/0858; H04L 43/078; H04L 43/0864
  See application file for complete search history.

(56) References Cited

U.S. PATENT DOCUMENTS

| | | | |
|---|---|---|---|
| 9,065,748 B2 | 6/2015 | Wong et al. | |
| 9,401,856 B2 | 7/2016 | Magee et al. | |
| 9,491,106 B2 | 11/2016 | Le Pallec et al. | |
| 10,164,867 B2 | 12/2018 | Thubert et al. | |
| 10,623,326 B2 | 4/2020 | Thubert et al. | |
| 10,847,968 B2 * | 11/2020 | Zhao | H04B 3/50 |
| 2012/0099854 A1 * | 4/2012 | Fourcand | H04L 43/0858 370/252 |
| 2015/0172154 A1 * | 6/2015 | Wong | H04L 43/087 370/244 |
| 2019/0356600 A1 | 11/2019 | Barton et al. | |

OTHER PUBLICATIONS

"Asymmetric Delay Control", 7705 Service Aggregation Router / Release 8.0.R4, Services Guide, Chapter 4, VLL Services, section 4.3.5.6, Mar. 2017, pp. 180-182, infocenter.Nokia.com.
(Continued)

*Primary Examiner* — Mohamed A Kamara
(74) *Attorney, Agent, or Firm* — Behmke Innovation Group LLC; Kenneth J. Heywood; Jonathon P. Western

(57) ABSTRACT

According to one or more embodiments, a first router receives a latency measurement indicative of latency associated with traffic sent from the first router to a second router. The first router calculates an asymmetrical latency as a difference between the latency measurement and a latency associated with traffic sent from the second router to the first router. The first router determines, based on the asymmetrical latency, a symmetrical latency target. The first router sends, to the second router, an indication of the symmetrical latency target. The first router and the second router adjust their respective de-jitter buffers to achieve the symmetrical latency target between the first router and the second router.

20 Claims, 10 Drawing Sheets

(56) References Cited

OTHER PUBLICATIONS

"Mission-Critical Communications Networks for Power Utilities", Network Transformation with IP/MPLS for Synchrophasor Application, 2013, 18 pages, Alcatel-Lucent.

Blair, et al., "Validating Secure and Reliable IP/MPLS Communications for Current Differential Protection", online https://strathprints.strath.ac.uk/55961/1/Blair_etal_DPSP_2016_Validating_secure_and_reliable_IP_MPLS_communications.pdf, Mar. 2016, 6 pages.

Blair, et al., "Modelling and Analysis of Asymmetrical Latency in Packet-Based Networks for Current Differential Protection Application", IEEE Transactions on Power Delivery, Jun. 2018, vol. 33, Issue 3, pp. 1185-1193, IEEE.

Hui, et al., "Client-Server Synchronization and Buffering for Variable Rate Multimedia Retrievals", IEEE Journal on Selected Areas in Communications, Jan. 2016, vol. 14, Issue 1, pp. 226-237, IEEE.

"IEC 61850", online: https://en.wikipedia.org/wiki/IEC_61850, Dec. 25, 2020, 4 pages, Wikimedia Foundation, Inc.

Lam, Fai, "Teleprotection Over Internet Protocol/Multiprotocol Label Switching—Perfect Timing", Apr. 1, 2017, 13 pages, UtilityProducts.com.

\* cited by examiner

AUTOMATICALLY ENSURING SYMMETRICAL LATENCY IN TELEPROTECTION SYSTEMS

TECHNICAL FIELD

The present disclosure relates generally to computer networks, and, more particularly, to automatic ensuring symmetrical latency in teleprotection systems.

BACKGROUND

Teleprotection systems are used in electrical power grids to monitor the conditions of power transmission lines and coordinate the tripping of breakers, to isolate faults. For instance, teleprotection systems can quickly identify and report on anomalies in the phase, current, or voltage of a power line, so that corrective measures can be taken. Accordingly, network latency between teleprotection relays should be held to a minimum, to ensure proper operation of the power grid. If these latency requirements are not met, however, serious damage to the power grid can result.

The latency requirements for teleprotection systems require not only that the latency between teleprotection relays remains below a certain threshold, but also that the asymmetric latency (e.g., the difference between the latencies each direction) does not exceed a defined threshold. Even when symmetrical (e.g., congruent) network paths are used, the end-to-end latency can be stochastic and results in asymmetrical latency that exceeds the maximum allowable amount. For instance, asymmetry latency can be caused by irregular packet sizes, different software versions in the relays, unexpected network events, and even the circuitry and model of relays used at each end.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
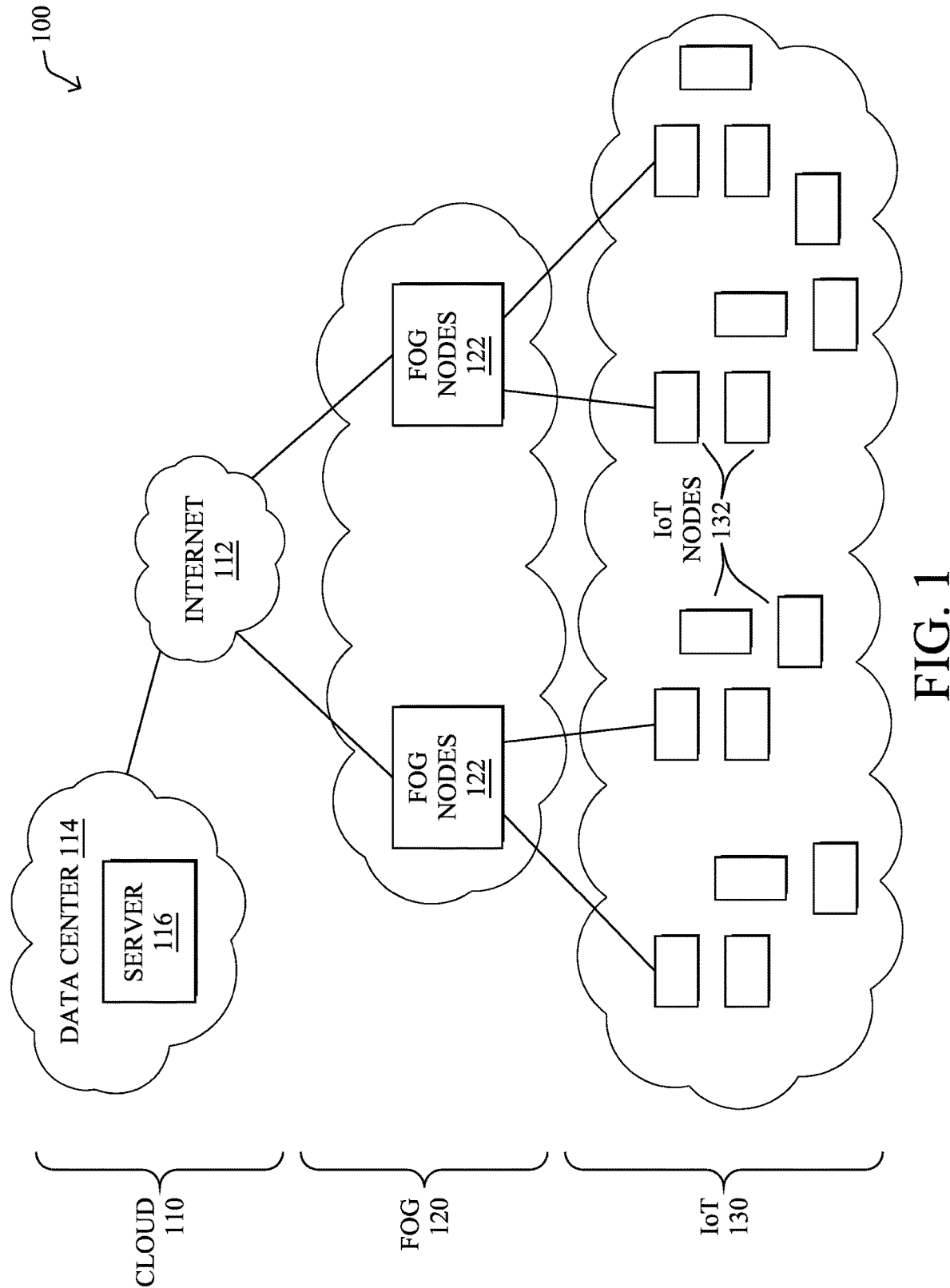
FIG. 1 illustrates an example network.

According to one or more embodiments of the disclosure, a first router receives a latency measurement indicative of latency associated with traffic sent from the first router to a second router. The first router calculates an asymmetrical latency as a difference between the latency measurement and a latency associated with traffic sent from the second router to the first router. The first router determines, based on the asymmetrical latency, a symmetrical latency target. The first router sends, to the second router, an indication of the symmetrical latency target. The first router and the second router adjust their respective de-jitter buffers to achieve the symmetrical latency target between the first router and the second router.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications, and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or Powerline Communication networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services.

Multiple fog nodes organized or configured together form a fog system, to is implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are is characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example simplified computer network 100 illustratively comprising nodes/devices at various levels of the network, interconnected by various methods of communication. For instance, the links may be wired links or shared media (e.g., wireless links, powerline communication links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely cloud layer 110, fog layer 120, and IoT device layer 130. Illustratively, the cloud layer 110 may comprise general connectivity via the Internet 112, and may contain one or more datacenters 114 with one or more centralized servers 116 or other devices, as will be appreciated by those skilled in the art. Within the fog layer 120, various fog nodes/devices 122 (e.g., with fog modules, described below) may execute various fog computing resources on network edge devices, as opposed to datacenter/cloud-based servers or on the endpoint nodes 132 themselves of the IoT device layer 130. For example, fog nodes/devices 122 may include edge routers and/or other networking devices that provide connectivity between cloud layer 110 and IoT device layer 130. Data packets (e.g., traffic and/or messages sent between the devices/nodes) may be exchanged among the nodes/devices of the computer network 100 using predefined network communication protocols such as certain known wired protocols, wireless protocols, powerline communication protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), powerline communication protocols, or other shared-media protocols where appropriate. In this context, a protocol consists of a set of rules defining how the nodes interact with each other.

Figure 2:
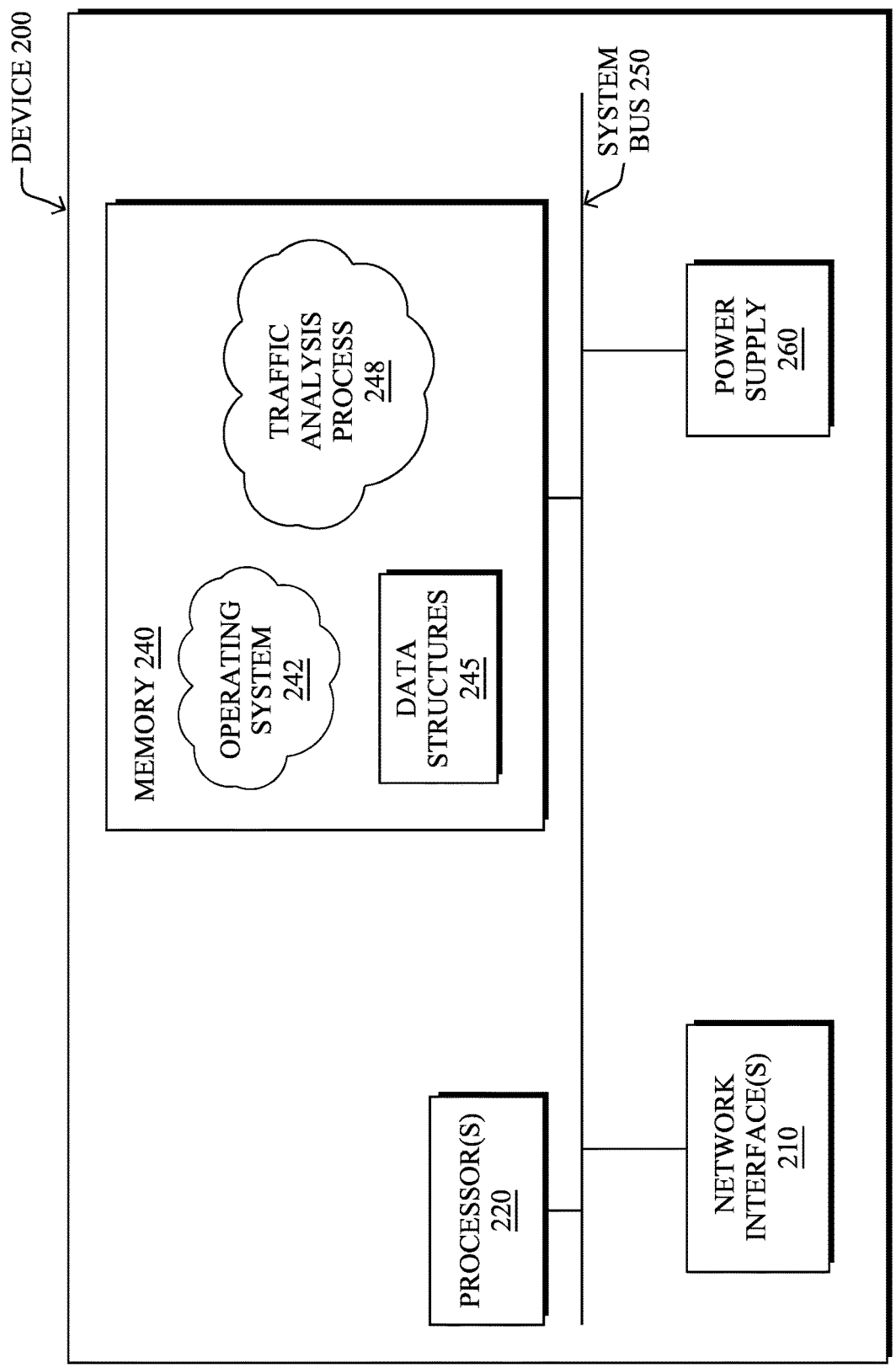
FIG. 2 illustrates an example network device/node.

FIG. 2 is a schematic block diagram of an example node/device 200 (e.g., an apparatus) that may be used with one or more embodiments described herein. For instance, node/device 200 may take the form of a wireless access point, a controller for a wireless access point, a mobile client, or another device in communication therewith (e.g., a switch, a router, a server, etc.). As shown, device 200 may comprise one or more communication interfaces 210 (e.g., wired, wireless, etc.), at least one processor 220, and a memory 240 interconnected by a system bus 250, as well as a power supply 260 (e.g., battery, plug-in, etc.).

Communication interface(s) 210 include the mechanical, electrical, and signaling circuitry for communicating data over a communication link. To this end, communication interface(s) 210 may be configured to transmit and/or receive data using a variety of different communication protocols, such as TCP/IP, UDP, etc. Note that the device 200 may have multiple different types of communication interface(s) 210, e.g., wireless and wired/physical connections, and that the view herein is merely for illustration.

The memory 240 comprises a plurality of storage locations that are addressable by the processor(s) 220 and the communication interface(s) 210 for storing software programs and data structures associated with the embodiments described herein. The processor 220 may comprise necessary elements or logic adapted to execute the software programs and manipulate the data structures 245. An operating system 242, portions of which are typically resident in memory 240 and executed by the processor(s), functionally organizes the node by, inter alia, invoking network operations in support of software processors and/or services executing on the device. These software processors and/or services may comprise a latency synchronization process 248, detailed further below.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Figure 3:
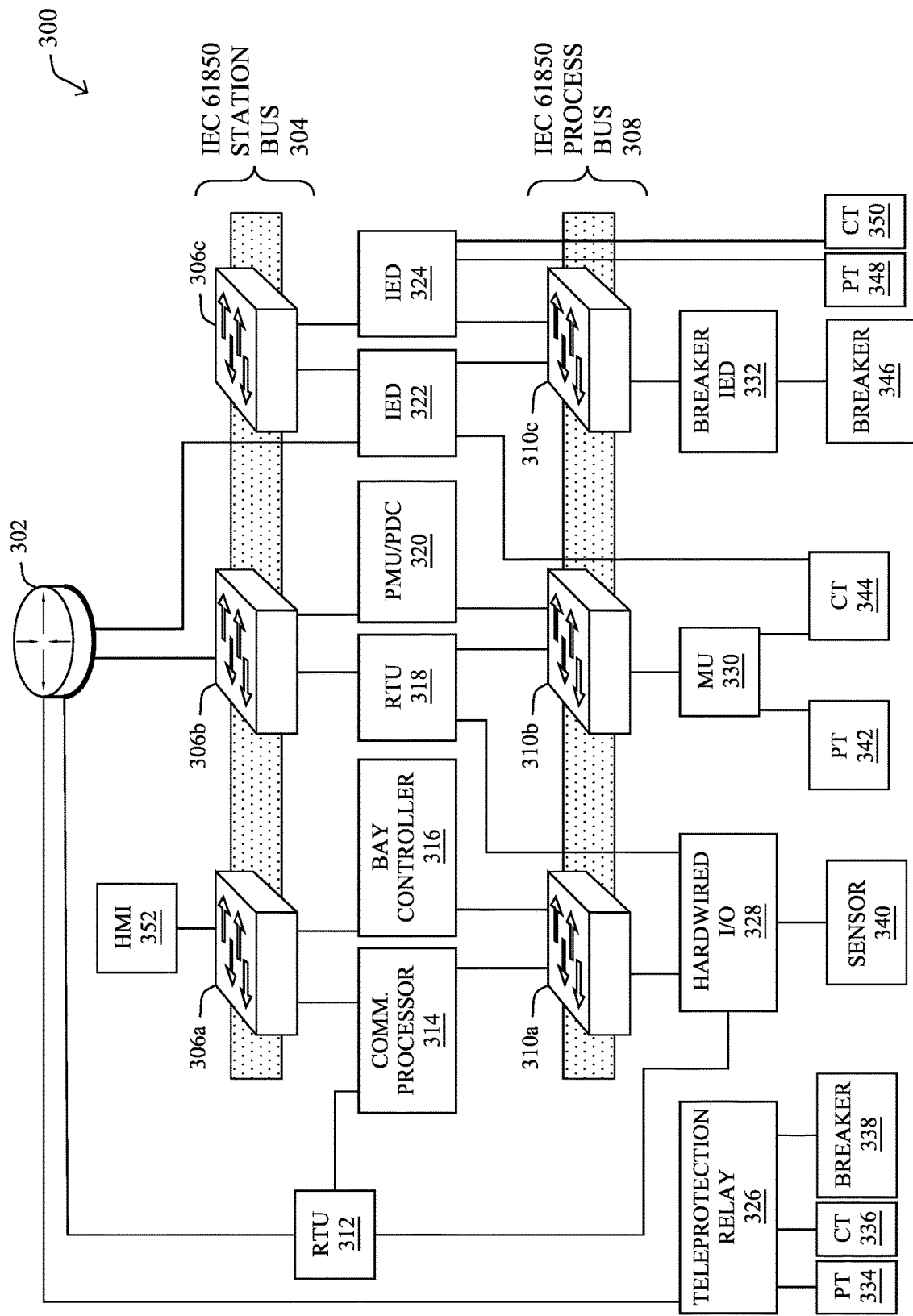
FIG. 3 illustrates an example power utility automation network.

FIG. 3 illustrates an example power utility automation network 300, according to various embodiments. Power utility automation network 300 represents a typical network for a power utility substation. As shown, power utility automation network 300 may comprise networking equipment such as a router 302, an IEC 61850 station bus 304 comprising any number of switches 306 (e.g., switches 306a-306c shown), and an IEC 61850 process bus 308 comprising any number of switches 310 (e.g., switches 310a-310c shown). As would be appreciated, power utility automation network 300 is intentionally simplified for purposes of describing the techniques herein and a deployed power utility automation network may include different configurations, device types, or the like, to which the techniques herein could equally apply.

Connected to the networking equipment of power utility automation network 300 may be any number of endpoints, such as the equipment responsible for measuring the power that the substation receives and distributes. For instance, power utility automation network 300 may include any or all of the following equipment:

Potential transformers (PTs)—these devices are used to measure the potential/voltages on the lines of the substation. Typically, a PT will scale down the high voltage on the line for input to its measuring circuitry, to prevent damage to the circuitry (e.g., by scaling down a line voltage of 110 kV to 5V, etc.). For instance, power utility automation network 300 may include PTs 334, 342, and 348 as endpoints, as shown.

Current transformers (CTs)—these sensors are used to measure the currents on the lines of the substation. Similar to the operation of a PT, a CT will typically step down the high current on the line to a manageable current for consumption by its measurement circuitry. For instance, power utility automation network 300 may include CTs 336, 344, and 350 as endpoints, as shown.

Phasor measurement units (PMUs)/phasor data concentrators (PDCs)—these sensors are configured to measure the magnitudes and phase angles of the electricity flowing through the substation. For instance, power utility automation network 300 may include PMU/PDC 320.

Circuit breakers—a circuit breaker generally functions to protect the substation and its equipment from damage by opening a circuit in the presence of an error, such as short circuits, overloads, etc. For instance, as shown, power utility automation network 300 may include circuit breakers 338 and 346.

Control devices—as would be appreciated, power utility automation network 300 may also include any number of control devices such as remote terminal units (RTUs) (e.g., RTUs 312, 318), intelligent electronic devices (IEDs) (e.g., IEDs 322, 324, and 332), teleprotection relay(s) (e.g., teleprotection relay 326), communication processor(s) (e.g., comm. processor 314), bay controller(s) (e.g., bay controller 316), merging unit(s) (MUs) (e.g., MU 330), etc.

Human-machine interfaces (HMIs)—these devices may take the form of terminals or other user interface devices that allow a user to interact with power utility automation network 300 such as by monitoring the operation of the substation, issuing commands, changing parameters, and the like. For instance, power utility automation network 300 may include HMI 352.

Other sensors—power utility automation network 300 may also include other sensors, such as sensor 340, that are to capture further sensor data such as, but not limited to, temperature, humidity, audio and/or video, etc., and may be connected to power utility automation network 300 by hardwired I/O 328.

As noted above, the latency requirements for teleprotection systems require not only that the latency between teleprotection relays remains below a certain threshold, but also that the asymmetric latency (e.g., the difference between the latencies each direction) does not exceed a defined threshold. For instance, the International Electrotechnical Commission (IEC) 61850-90-12 standard specifies that the asymmetric latency should be below 200 microseconds.

Even when symmetrical (e.g congruent) network paths are used, the end-to-end latency can be stochastic and results in asymmetrical latency that exceeds the maximum allowable amount. For instance, asymmetry latency can be caused by irregular packet sizes, different software versions in the relays, unexpected network events, and even the circuitry and model of relays used at each end.

Figure 4:
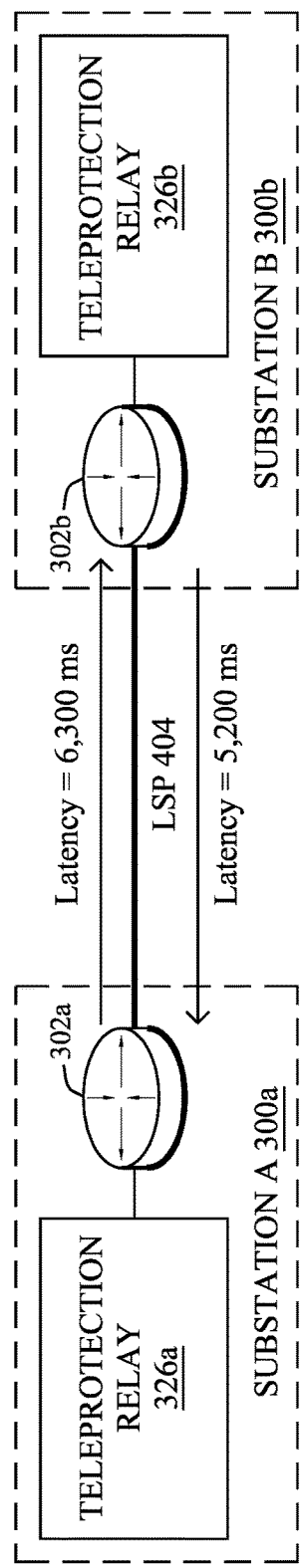
FIG. 4 illustrates an example of asymmetrical latencies between routers of different power substations.

FIG. 4 illustrates an example 400 of asymmetrical latencies between routers of different power substations, according to various embodiments. Assume, for instance, that there are two substations, A and B, each comprising its own power utility automation network 300a and 300b, respectively. Accordingly, power utility automation networks 300a and 300b may communicate with one another via their respective routers 302a and 302b. For instance, routers 302a-302b may be label switched routers (LSRs) that establish one or more Multiprotocol Label Switching (MPLS) label switched paths (LSPs) 404 between one another, to facilitate communications between the two substations. In doing so, this allows teleprotection relay 326a located at substation A to notify teleprotection relay 326b located at substation B of any anomalies (e.g., in the measured phase, current, or voltage at substation A), and vice-versa.

As shown, the communications between routers 302a-302b may exhibit asymmetrical latency. For instance, assume that the traffic sent from router 302a to router 302b has a measured latency of 6,300 ms. However, traffic in the opposite direction, from router 302b to router 302a has a measured latency of only 5,200 ms. In this case, the latencies between the two substations, and their respective teleprotection relays, are asymmetric.

——Automatic Ensuring Symmetrical Latency in Teleprotection Systems——

The techniques herein introduce a mechanism to automatically ensuring symmetric latency in teleprotection systems and other networks. In some aspects, the techniques herein may synchronize the dejitter buffers on routers attached to the teleprotection relays, with one of the routers serving as the primary that is responsible for overseeing the synchronization. As a result, the asymmetric latency between the two routers can be held to a minimum, thereby meeting any asymmetric latency requirements of the network.

Illustratively, the techniques described herein may be performed by hardware, software, and/or firmware, such as in accordance with latency synchronization process 248, which may include computer executable instructions executed by the processor 220 (or independent processor of interfaces 210) to perform functions relating to the techniques described herein.

Specifically, according to various embodiments, a first router receives a latency measurement indicative of latency associated with traffic sent from the first router to a second router. The first router calculates an asymmetrical latency as a difference between the latency measurement and a latency associated with traffic sent from the second router to the first router. The first router determines, based on the asymmetrical latency, a symmetrical latency target. The first router sends, to the second router, an indication of the symmetrical latency target. The first router and the second router adjust their respective de-jitter buffers to achieve the symmetrical latency target between the first router and the second router.

Figure 5A:
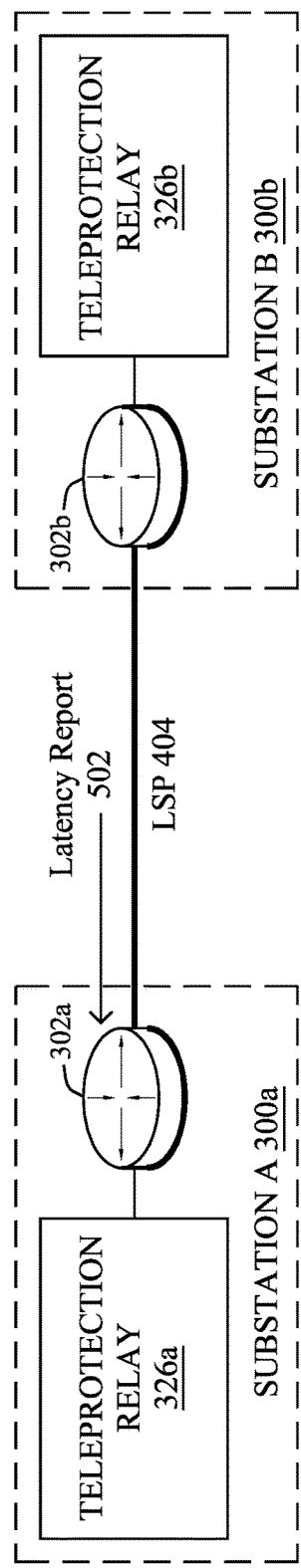
FIGS. 5A-5E illustrate examples of achieving symmetrical latencies between routers.

Operationally, FIGS. 5A-5E illustrate examples of achieving symmetrical latencies between routers, according to various embodiments. As shown in FIG. 5A and continuing the example of FIG. 4, assume that each of teleprotection relays 326a-326b is are connected to routers 302a-302b, respectively, which terminate one or more MPLS LSP(s) 404 over which the teleprotection application runs. Assume also that the latencies shown in FIG. 4 are present in the forward direction (e.g., from router 302a towards router 302b) and the backwards direction (e.g., from router 302b towards router 302a).

As would be appreciated, teleprotection relays 326a-326b may be time synchronized, such as by leveraging Synchronous Ethernet (SyncE) or other suitable protocol. Routers 302a-302b may also be time synchronized using a suitable protocol, such as the Precision Time Protocol (PTP) or the like. This clock synchronization may be leveraged to measure the latency along the data path (e.g., the pseudowire latency between routers 302a-302b). For instance, a communication may be timestamped by the sending device. In turn, since the clock of the receiving device is synchronized to that of the sender, the receiving device may compare its clock to the timestamp, to determine how much latency is associated with the received communication.

To achieve coordination in the latencies in both directions between routers 302a-302b, one of the routers may be elected as a primary that drives the synchronization mechanism on behalf of both routers. This selection can be made via a user interface or automatically by routers 302a-302b. To illustrate the techniques herein, assume that router 302a has been selected as the primary for the pair of routers. In various embodiments, the goal of this coordination to configure the depths of the de-jitter buffers of routers 302a-302b, so as to ensure that the latencies in both directions are within a predefined threshold of one another.

In the default state, both of routers 302a-302b begin by measuring the path latency for the traffic that they receive, respectively. Thus, the primary router 302a may measure the latency of any traffic that it, receives from router 302b. Router 302h may likely do so with respect to the traffic that it receives from router 302a.

According to various embodiments, once routers 302a-302b have measured the latencies for the two directions, the secondary router 302b may send a latency report 502 to router 302a. Preferably, this signaling is conveyed via a secure channel, so as to protect the integrity of the latency adjustments and the teleprotection system from malicious actors. Latency report 502 indicates the latency measurement for the traffic sent by router 302a to router 302b. Consequently, router 302a will have information regarding both the forward and reverse path latencies between router 302a and router 302b.

Figure 5B:
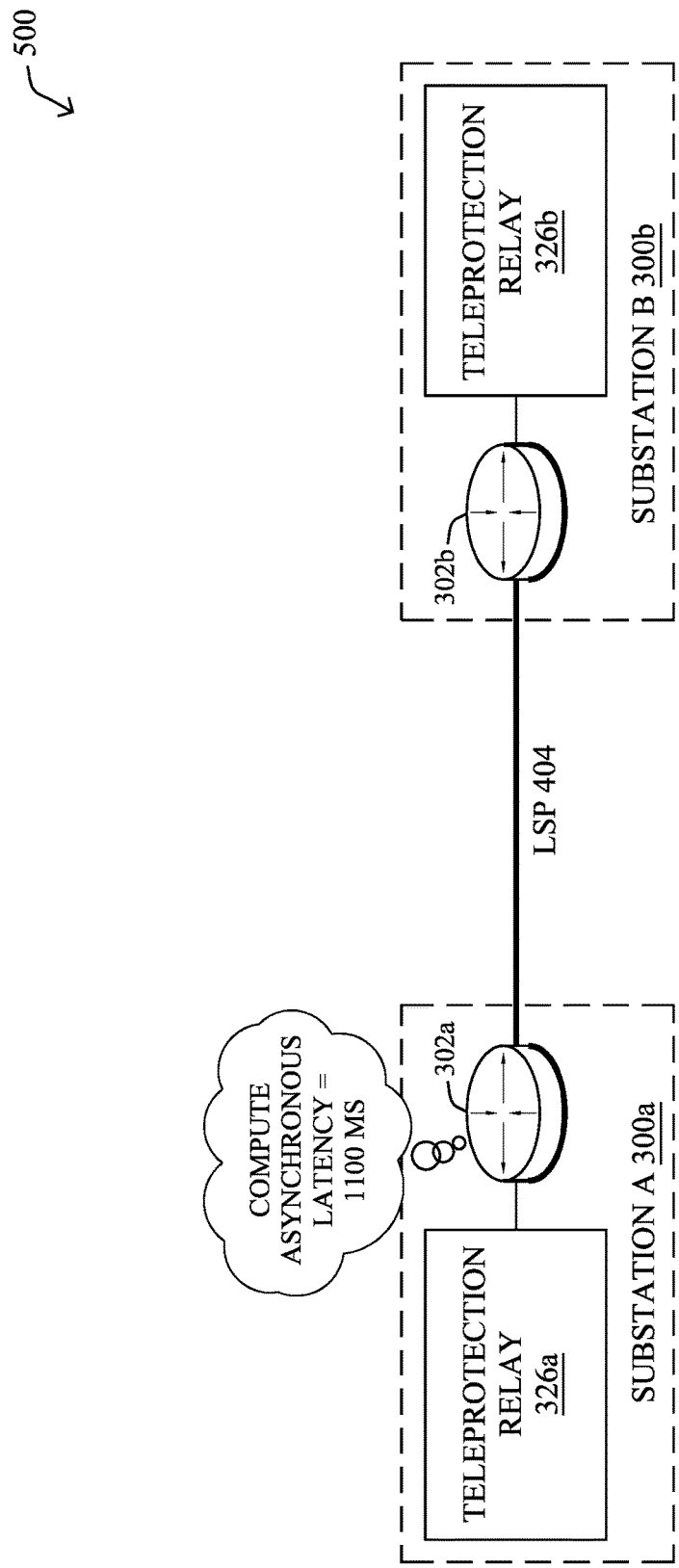

In FIG. 5B, the primary router 302a may compute the asynchronous latency comparing the latencies, and calculating the difference between the latencies measured in the forward and reverse directions. For instance, if the forward latency is 6,300 ms and reverse latency is 5,200 ms, router 302a may determine that the asynchronous latency is 1,100 ms (e.g., the difference between the measured latencies). If this value is below the acceptable threshold, then router 302a may simply continue to receive latency reports from 302b and recompute the asynchronous latency.

Figure 5C:
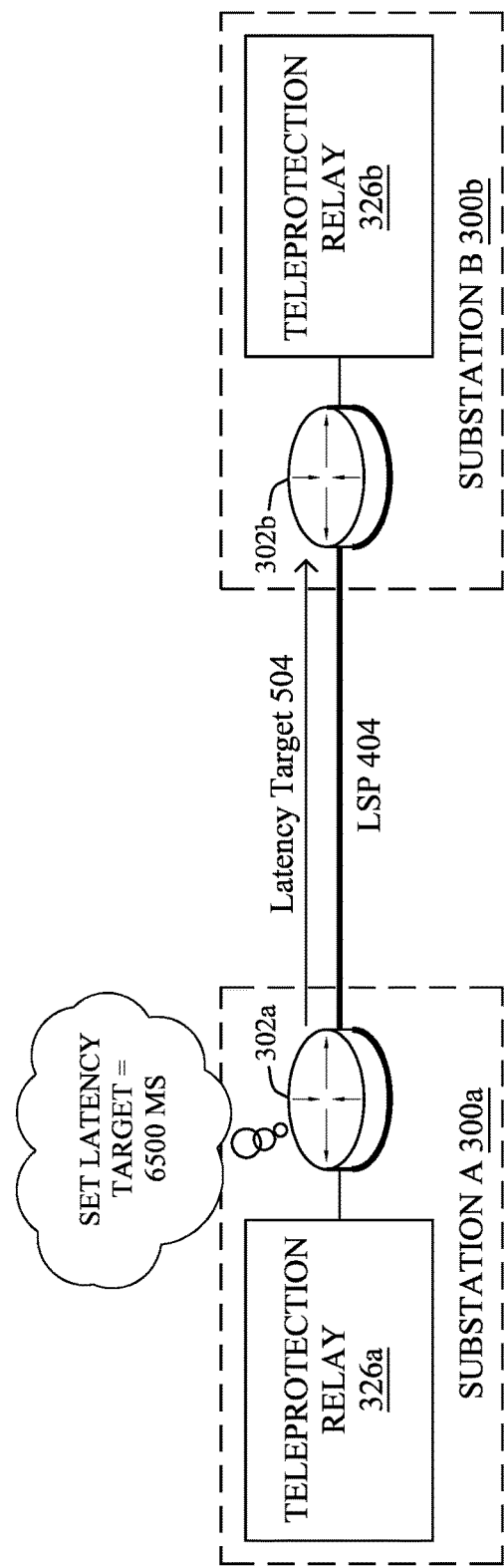

In FIG. 5C, router 302a may determine a symmetrical latency target value, based on the computed asynchronous latency. Generally speaking, a maximum target value may be predefined, so as to ensure that the traffic in each direction satisfies both the unidirectional latency requirements, as well as the asynchronous latency requirements of the system. Typically, the symmetrical latency target will be larger than either of the latencies measured for the two directions. For instance, router 302a may set the target symmetrical latency target to be 6,500 ms. This will be target latency for both directions of communication. Router 302a then sends a message 504 that indicates the symmetrical latency target to router 302b, such as via the secure channel used to convey latency report 502 to router 302a.

Figure 5D:
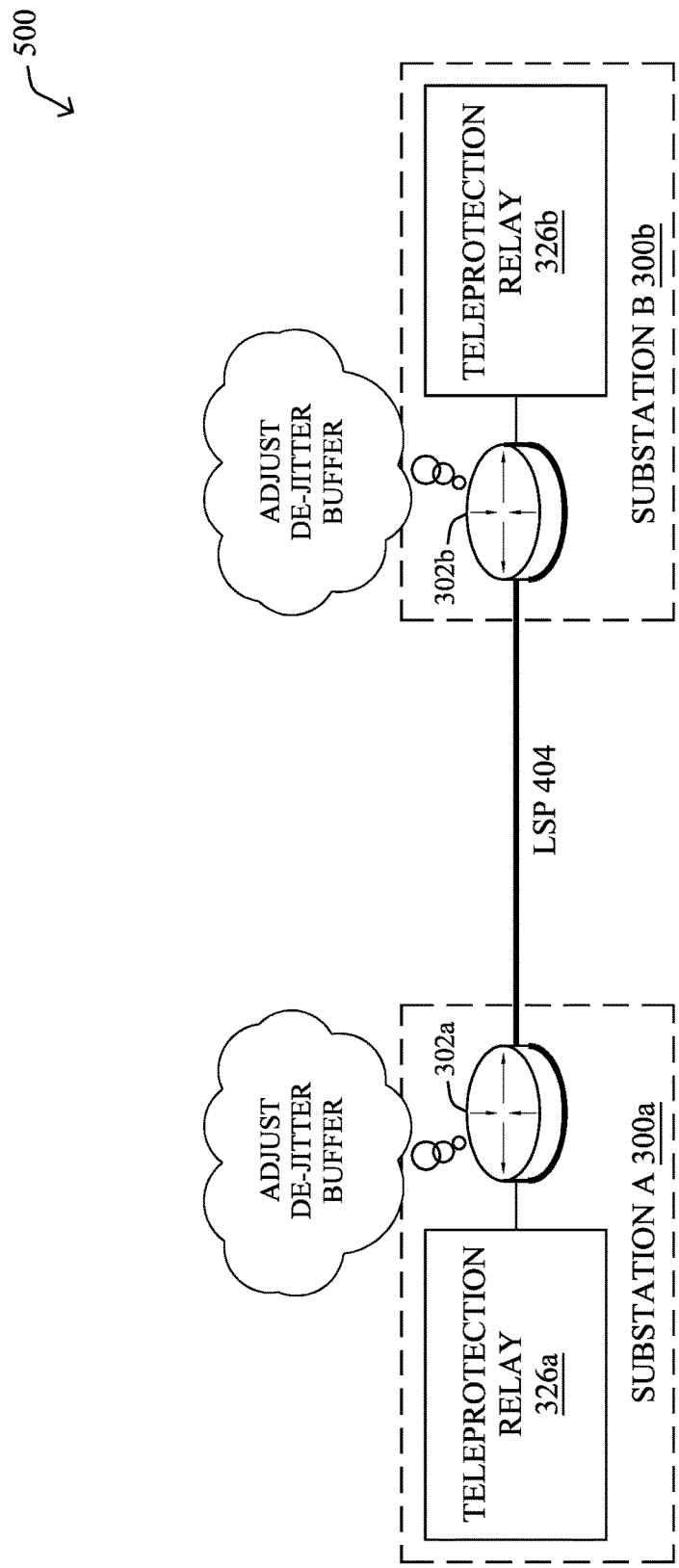

According to various embodiments, as shown in FIG. 5D, each of routers 302a-302b may adjust the depth of its de-jitter buffer, so as to achieve the latency target determined by router 302a. For instance, router 302b may increase the depth of its de-jitter buffer by a certain amount, in response to receiving message 504. Likewise, router 302a may increase the depth of its dc-jitter by a certain amount, to also achieve the symmetrical latency target in the forward direction.

For example, if the latency in the forward direction was 6,300 ms and the latency in the reverse direction was 5,200 ms, this means that router 302a will need to adjust the depth of its de-jitter buffer to increase the forward latency by 200 ms, to achieve the latency target of 6,500 ms. Similarly, router 302b will need to increase the depth of its de jitter buffer by 1,300 ms, to achieve the target latency of 6,500 ms in the reverse direction. In various embodiments, routers 302*a*-302*b* may increase the depths of their de-jitter buffers proportionally, until the latencies in the forward and reverse directions approximately equal the symmetrical latency target.

Figure 5E:
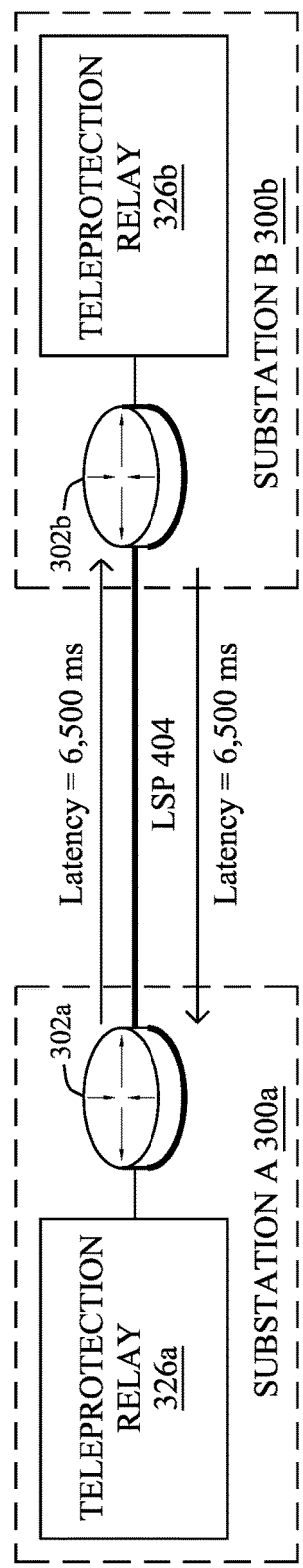

As shown in FIG. 5E, once the target latency is achieved, the path latency in both directions should be symmetrical, thus achieving the requirements of the application. In some embodiments, both router 302*a* and 302*b* may continually measure the forward and reverse path latencies and automatically adjust their de-jitter buffers, in the presence of changing conditions. Of course, if the symmetrical latency target cannot be achieved, an alert may be sent to a user interface for review by a network operator.

In another embodiment, router 302*b* may be instructed to report latency deviations to router 302*a*, only when they reach a target threshold (e.g., +−50 microseconds). In a variation of this embodiment, router 302*b* may be set to incrementally and automatically adjust its de-jitter buffer, accordingly, and report the increment to router 302*a* (who adjusts its buffer value symmetrically), as long as the increment is within bounds specified by router 302*a*. For instance, router 302*a* may specify to router 302*b* that router 302*b* is authorized to increase its latency using increments of up to 20 microseconds, max, that more than ten increments up or down are allowed, and that the latency cannot be less than 6,300 microseconds, without having to notify router 302*a*.

Note that the above approach results in symmetrical latency from the network perspective. However, further embodiments may also include teleprotection relays 326*a*-326*b* as part of the symmetrical latency mechanism. For example, teleprotection relays 326*a*-326*b* may use different relay models or different generations of the same model. The difference in firmware, circuitry, and even physical interfaces can have an impact on latency in the attachment circuit. Thus, in another embodiment, teleprotection relays 326*a*-326*b* themselves may also measure the end to end path latencies for the teleprotection application, such as using SynchE. In this case, to automate the de-jitter buffer adjustments and latency balancing, teleprotection relays 326*a*-326*b* may communicate to their respective routers 302*a*-302*b* their observed latency values. In turn, the primary router 302*a* may maintain a time-series table of these latency values and use this to dynamically adjust the de-jitter buffers in both routers 302*a*-302*b*, to achieve the best possible latency symmetry.

Figure 6:
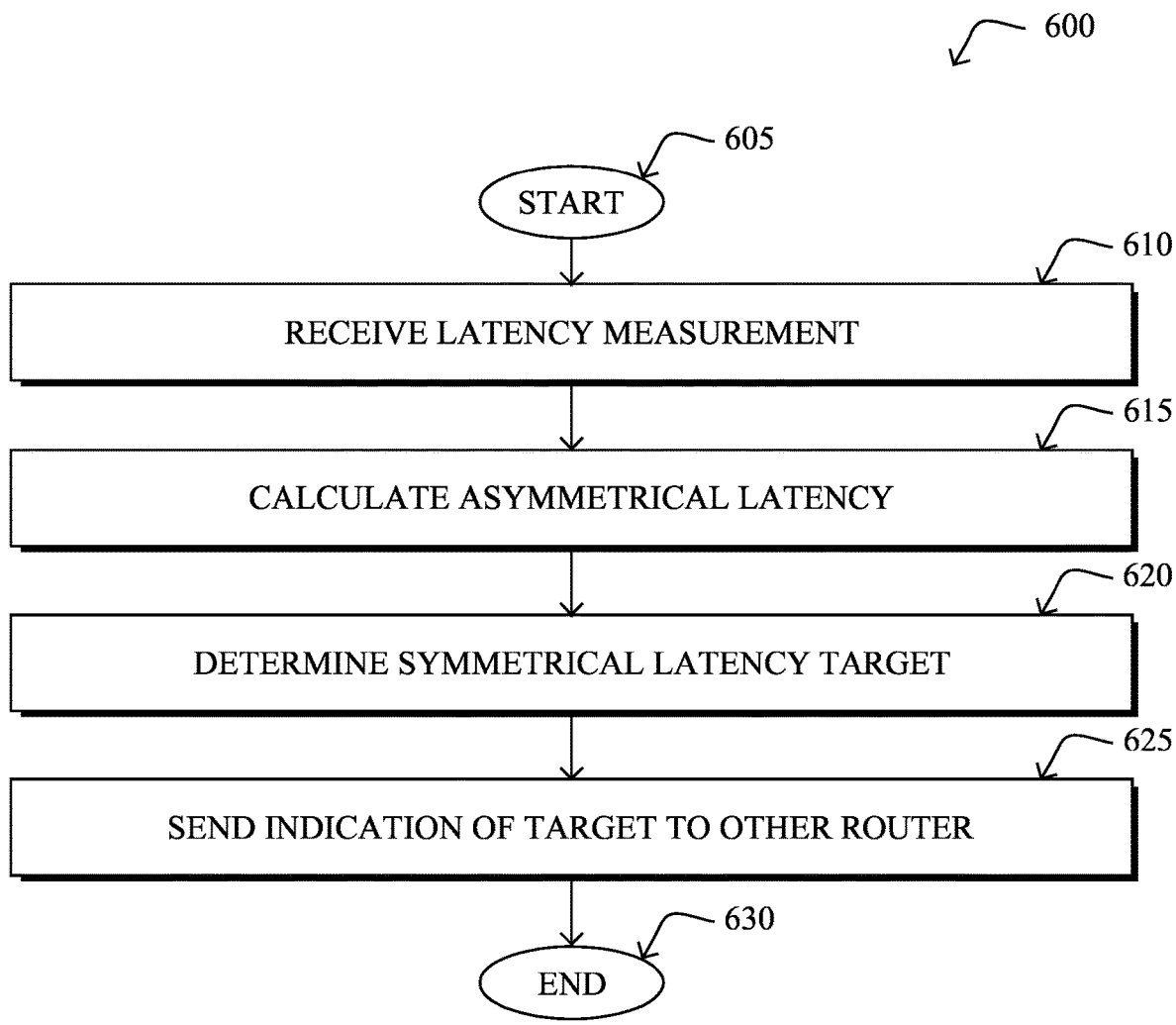
FIG. 6 illustrates an example simplified procedure for determining a symmetrical latency target for a path.

FIG. 6 illustrates an example simplified procedure for determining a symmetrical latency target for a path, in accordance with one or more embodiments described herein. In various embodiments, a non-generic, specifically configured device (e.g., device 200), such as a network switch, router, security appliance, or other device in communication therewith, may perform procedure 600 by executing stored instructions (e.g., process 248). The procedure 600 may start at step 605, and continues to step 610, where, as described in greater detail above, a first router may receive a latency measurement indicative of latency associated with traffic sent from the first router to a second router. For instance, the routers may be label switched routers (LSR) and may be located at different power substations. In various embodiments, the first router may receive the latency measurement from the second router, from a teleprotection relay, or another device.

At step 615, as detailed above, the first router may calculate an asymmetrical latency as a difference between the latency measurement and a latency associated with traffic sent from the second router to the first router. For instance, the first router may compute the latency of traffic that it receives from the second router. In turn, the first router may compute the difference between the two latency measurements, to determine the asymmetric latency between the two routers.

At step 620, the first router may determine, based on the asymmetrical latency, a is symmetrical latency target, as described in greater detail above. In general, the symmetrical latency target may be a target amount of latency for both directions of traffic between the two routers. Typically, the symmetrical latency target may be greater than the latency measurement and/or the latency of the traffic sent from the second router to the first.

At step 625, as detailed above, the first router may send, to the second router, an indication of the symmetrical latency target. In various embodiments, the first router and the second router adjust their respective de-jitter buffers to achieve the symmetrical latency target between the first router and the second router. For instance, the routers may incrementally depths of their de-jitter buffers until the traffic sent from the first router to the second router and the traffic sent from the second router to the first router both exhibit latencies equal to the symmetrical latency target. In one embodiment, this can be achieved by the second router sending an indication of a de-jitter buffer depth increase to the first router, which then increases its own de-jitter buffer depth, accordingly. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce mechanisms to ensure symmetrical latency between devices, such as between teleprotection relays. In particular, the techniques herein allow for the routers attached to the teleprotection relays to adjust their de-jitter buffers, so as to control the amount of latency associated with their respective traffic to one another.

While there have been shown and described illustrative embodiments for ensuring symmetrical latency, it is to be understood that various other adaptations and modifications may be made within the intent and scope of the embodiments herein. For example, while certain protocols are described herein, the techniques herein are not limited as such and can be applied to operate in conjunction with any number of other protocols.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method comprising:
receiving, at a first router, a latency measurement indicative of latency associated with traffic sent from the first router to a second router;
calculating, by the first router, an asymmetrical latency as a difference between the latency measurement and a latency associated with traffic sent from the second router to the first router;
determining, by the first router and based on the asymmetrical latency, a symmetrical latency target; and
sending, by the first router and to the second router, an indication of the symmetrical latency target, wherein the first router and the second router adjust their respective de-jitter buffers to achieve the symmetrical latency target between the first router and the second router.

2. The method as in claim 1, wherein the first router and the second router are label switched routers.

3. The method as in claim 1, wherein the first router and the second router are located at different power substations.

4. The method as in claim 1, wherein the first router receives the latency measurement from a teleprotection relay.

5. The method as in claim 1, wherein the first router and the second router adjust their respective de-jitter buffers to achieve the symmetrical latency target between the first router and the second router by:
incrementally increasing depths of their de-jitter buffers until the traffic sent from the first router to the second router and the traffic sent from the second router to the first router both exhibit latencies equal to the symmetrical latency target.

6. The method as in claim 5, further comprising:
receiving, at the first router and from the second router, an indication of a de-jitter buffer depth increase by the second router.

7. The method as in claim 1, further comprising:
sending an alert to a user interface, when the symmetrical latency target cannot be achieved.

8. The method as in claim 1, wherein the first router determines the symmetrical latency target based in part on a comparison between the asymmetrical latency computed by the first router and a predefined threshold.

9. The method as in claim 1, wherein the symmetrical latency target is greater than the latency measurement.

10. The method as in claim 9, wherein the symmetrical latency target is greater than the latency associated with the traffic sent from the second router to the first router.

11. An apparatus, comprising:
one or more interfaces;
a processor coupled to the one or more interfaces and configured to execute one or more processes; and
a memory configured to store a process that is executable by the processor, the process when executed configured to:
receive a latency measurement indicative of latency associated with traffic sent from the apparatus to a router;
calculate an asymmetrical latency as a difference between the latency measurement and a latency associated with traffic sent from the router to the apparatus;
determine, based on the asymmetrical latency, a symmetrical latency target; and
send, to the router, an indication of the symmetrical latency target, is wherein the apparatus and the router adjust their respective de-jitter buffers to achieve the symmetrical latency target between the apparatus and the router.

12. The apparatus as in claim 11, wherein the apparatus is a label switched router.

13. The apparatus as in claim 11, wherein the apparatus and the router are located at different power substations.

14. The apparatus as in claim 11, wherein the apparatus receives the latency measurement from a teleprotection relay.

15. The apparatus as in claim 11, wherein the apparatus and the router adjust their respective de-jitter buffers to achieve the symmetrical latency target by:
incrementally increasing depths of their de-jitter buffers until the traffic sent from the apparatus to the router and the traffic sent from the router to the apparatus both exhibit latencies equal to the symmetrical latency target.

16. The apparatus as in claim 11, wherein the process when executed is further configured to:
receive, from the router, an indication of a de-jitter buffer depth increase by the router.

17. The apparatus as in claim 11, wherein the process when executed is further configured to:
send an alert to a user interface, when the symmetrical latency target cannot be achieved.

18. The apparatus as in claim 11, wherein the apparatus determines the symmetrical latency target based in part on a comparison between the asymmetrical latency computed by the apparatus and a predefined threshold.

19. The apparatus as in claim 11, wherein the symmetrical latency target is greater than the latency measurement.

20. A tangible, non-transitory, computer-readable medium storing program instructions that cause a first router to execute a process comprising:
receiving, at the first router, a latency measurement indicative of latency associated with traffic sent from the first router to a second router;
calculating, by the first router, an asymmetrical latency as a difference between the latency measurement and a latency associated with traffic sent from the second router to the first router;
determining, by the first router and based on the asymmetrical latency, a symmetrical latency target; and
sending, by the first router and to the second router, an indication of the symmetrical latency target, wherein the first router and the second router adjust their respective de-jitter buffers to achieve the symmetrical latency target between the first router and the second router.

* * * * *

UNITED STATES PATENT AND TRADEMARK OFFICE
CERTIFICATE OF CORRECTION

| | |
|---|---|
| PATENT NO. | : 11,502,968 B1 |
| APPLICATION NO. | : 17/244342 |
| DATED | : November 15, 2022 |
| INVENTOR(S) | : Robert E. Barton |

It is certified that error appears in the above-identified patent and that said Letters Patent is hereby corrected as shown below:

In the Specification

Column 3, Line 2, please amend as shown:
fog system, to implement a particular solution. Fog nodes Column 3, Line 41, please amend as shown:
nects are characterized by, illustratively, high loss rates, Column 6, Line 49, please amend as shown:
Even when symmetrical (e.g., congruent) network paths Column 7, Line 48, please amend as shown:
relays 326a-326b are connected to routers 302a-302b, Column 8, Line 15, please amend as shown:
latency of any traffic that it receives from router 302b.

Column 8, Line 16, please amend as shown:
Router 302b may likely do so with respect to the traffic that Column 8, Line 59, please amend as shown:
increase the depth of its de-jitter by a certain amount, to also Column 10, Line 9, please amend as shown:
asymmetrical latency, a symmetrical latency target, as In the Claims Column 12, Line 8, in Claim 11, please amend as shown:
latency target, wherein the apparatus and the router Signed and Sealed this
Twenty-eighth Day of February, 2023

Katherine Kelly Vidal
*Director of the United States Patent and Trademark Office*